United States Patent [19]

McClain

[11] 4,403,068

[45] Sep. 6, 1983

[54] PROCESS FOR SUPPRESSING THE FORMATION OF OVERSIZED PARTICLES OF THERMOPLASTIC RESIN PRODUCED BY AN AQUEOUS DISPERSION PROCEDURE

[75] Inventor: Dorothee M. McClain, Cincinnati, Ohio

[73] Assignee: National Distillers and Chemical Corporation, New York, N.Y.

[21] Appl. No.: 348,559

[22] Filed: Feb. 12, 1982

[51] Int. Cl.$^3$ .............................. C08F 6/24; C08F 8/12
[52] U.S. Cl. .......................................... 525/62; 264/9; 524/394; 524/400; 525/60; 528/486
[58] Field of Search ............... 528/486; 525/62; 264/9

[56] References Cited

U.S. PATENT DOCUMENTS

| 3,517,083 | 6/1970 | Salyer | 525/222 |
| 3,968,091 | 7/1976 | Stiles et al. | 528/503 |
| 4,151,134 | 4/1979 | McClaw | 525/62 |

*Primary Examiner*—Stanford M. Levin
*Attorney, Agent, or Firm*—Kenneth D. Tremain

[57] ABSTRACT

A process is provided for obtaining particles of thermoplastic resin which comprises agitating said resin in the molten state in an aqueous dispersion system comprising a resin dispersing amount of an alkali metal soap and an oversized particle formation-suppressing amount of an alkaline earth metal soap and cooling the resulting dispersion to obtain said resin as finely divided particles of which no more than about 5 weight percent of the total exceeds an average diameter of about 420 microns.

24 Claims, No Drawings

PROCESS FOR SUPPRESSING THE FORMATION OF OVERSIZED PARTICLES OF THERMOPLASTIC RESIN PRODUCED BY AN AQUEOUS DISPERSION PROCEDURE

BACKGROUND OF THE INVENTION

This invention concerns a process for providing powders of thermoplastics such as polyethylene homopolymer, ethylene-vinyl acetate (EVA) copolymer and partially hydrolyzed ethylene-vinyl acetate (HEVA) copolymer by an aqueous dispersion procedure and, in particular, is an improvement of the process of U.S. Pat. No. 4,151,135, the entire contents of which are incorporated by reference herein.

Thermoplastic resins in finely-divided form have found use in a number of applications where it is either impossible or inconvenient to utilize the more conventional cube or pellet forms. For example, powdered organic polymeric thermoplastic resins in dry form have been used to coat articles by dip coating wherein the powder is applied by spraying or dusting, and by flame spraying. In dispersed form, thermoplastic resin powders have been applied as coatings by roller coating, spray coating, slush coating, and dip coating to substrates such as metal, paper, paperboard, and the like. These powders have also been widely employed in conventional powder molding techniques. Other applications of these powders include paper pulp additives; mold release agents for rubber; additives to waxes, paints, and polishes; binders for non-woven fabrics; and so on.

High pressure EVA copolymers are a well-known class of thermoplastic resins. Copolymers containing up to about 60 weight percent of vinyl acetate are now available commercially via a modified high pressure polyethylene process operating at 1,000–2,000 atmospheres, and compositions containing as much as 85 weight percent vinyl acetate have been made experimentally by the high pressure process. EVA resins containing up to about 35 weight percent of vinyl acetate are readily handled in the form of pellets, yet even resins with a vinyl acetate content in the upper part of this range tend to stick together under the pressure of their own weight, especially under hot storage conditions. Copolymers containing between about 35 and about 60 weight percent of vinyl acetate can also be pelletized, but the pellets tend to be tacky and coalesce increasingly at higher vinyl acetate contents in this range. At about 40 to 45 weight percent vinyl acetate, the pellets maintain their identity, but often partially fuse into bulky masses resembling bunches of grapes. At 50 to 60 weight percent vinyl acetate content, the pellets soon lose their identity and these resins normally assume the shape of their container by cold flow, and consequently are only available as solid blocks. Copolymers containing 35–85 weight percent vinyl acetate can be produced with melt flow rates below 5 (Condition B, ASTM D1238) and in most cases as low as 0.2, when finished by thermal treatment by known methods, e.g., U.S. Pat. No. 3,968,091.

U.S. Pat. No. 3,517,083 discloses that EVA resins containing 15 to 60 weight percent vinyl acetate may be used as impact modifiers in rigid polyvinyl chloride (PVC) formulations, and that EVA copolymers containing 60 to 85 weight percent vinyl acetate are useful in producing flexible blends with PVC. However, a serious impediment in blending high pressure EVA into PVC is the aforesaid physical form of the EVA resins. To blend even PVA pellets into PVC, which is normally supplied as a powder, requires the expenditure of considerable energy and introduces an undesirable heat history into the PVC (e.g., see *Plastics Engineering*, April 1967, p. 47; *Plastics Technology*, July 1975, P. 50). Blending of the fused pellets characteristic of the EVA resins containing above about 50 weight percent vinyl acetate would obviously be still more difficult than blending free pellets.

Accordingly, to facilitate the blending of high pressure EVA copolymers into PVC powder, and into other pulverulent polymers as well, it is often desirable to have the EVA copolymers in the powder form. Dry blending of PVC powder and the EVA powder is then readily accomplished at little expenditure of energy and without imparting an undesirable heat history to the heat-sensitive PVC due to the blending operation itself.

Hydrolyzed HEVA copolymers, particularly the so-called partially hydrolyzed copolymers, herein defined as EVA resins originally containing about 35 to about 85 weight percent of vinyl acetate, have been generally known for many years. They resemble the high pressure EVA resins in being inherently tacky materials but present certain advantages by virtue of their hydroxyl functionality, e.g., enhanced adhesion to various substrates, additional cross-linkability, and have superior heat and mill stability as compared to EVA. In addition, as disclosed in this invention, those less than 50% hydrolyzed also function as impact modifiers in rigid PVC formulations, whereas the substantially fully hydrolyzed EVA resins do not.

U.S. Pat. No. 4,151,135 describes processes which permit the comminution of tacky EVA copolymers and tacky HEVA copolymers from the pellet and block form into the form of fine particles via dispersion in an aqueous medium with the aid of an alkali metal soap of a higher carboxylic acid as the dispersing agent, optionally in the presence of a water-soluble, substantially neutral salt, and the subsequent recovery of the particles from the dispersion as compaction-resistant dry powders by chemically modifying the dispersing agent in situ to provide a protective coating for the particles. In the preferred embodiment, the alkali metal soap dispersing agent is converted to the corresponding alkaline earth metal soap by reacting it with a suitable alkaline earth metal compound, e.g., calcium hydroxide. Alternatively, the alkali metal soap dispersing agent can be modified chemically by acidifying it with sufficient acid to release the corresponding carboxylic acid at least in part, which provides sufficient protective action to permit the dispersed copolymers to be isolated, dried, and handled as free-flowing powders. Higher carboxylic acid-protected powders, however, are inferior in compaction resistance to alkaline earth metal soap protected powders, but the acid coating is readily converted to alkaline earth metal soap coatings by reaction with sufficient alkaline earth metal compound. As an alternative, the acid-coated particles can be coated with alkaline earth metal soap, either performed or formed in situ. By including sufficient saponifying agent in the EVA dispersion step to saponify the combined vinyl acetate in the EVA, the corresponding HEVA can be obtained directly as the dry powder, after applying any of the above methods for providing protection, without the need for hydrolysis before dispersion. In general, the EVA and HEVA resin powders obtained in accordance with the foregoing procedures are made up of particles, usually spherical, of an average diameter ranging from about 20 microns up to about 500 microns, with the majority (80–90%) of particles being less than 250 microns. With the preferred dispersing systems, a substantial majority of the particles are less than about 150 microns, usually ranging from about 20 to about 150 microns with most of the particles being in the range of about 50 to about 100 microns. Nevertheless, a significant portion of the particles, typically 5–10 weight percent of the total weight of dispersed resin, will be in the range of from about 420 to 500 microns or greater and as such can be regarded as oversized and disadvantageous in various blending and thermoforming operations. It may be noted that oversized particles are usually not spherical but are for the most part elongated, fiber-like particles and as such, are prone to causing obstructions in processing equipment, a result of their poor flow characteristics. In addition, where, for example, blending of EVA and PVC powders are concerned, uniform distribution of the EVA in the PVC requires that the particles of both resins be substantially spherical and of approximately the same size. Accordingly, where significant quantities of oversized particles cannot be tolerated, it becomes necessary to remove them by screening and, if desired, recycle them to the dispersion process. Such secondary operations, screening and recycling, necessarily reduce the efficiency of the dispersion process and result in higher capital investment and operation costs.

SUMMARY OF THE INVENTION

Carrying out the resin dispersion process of this invention, it is now possible to avoid the production of any significant quantity of oversized particles the presence of which might otherwise require such post-dispersion operations as screening and recycling referred to above. While the process of this invention is especially useful for providing uniform fine powders of ordinarily tacky resins such as certain types of EVA copolymer and HEVA terpolymer, it can also be applied to the manufacture of other thermoplastic resin powers as well.

Thus, in accordance with the present invention, a process is provided for obtaining particles of thermoplastic resin which comprises agitating said resin in the molten state in an aqueous dispersion system comprising a resin-dispersing amount of an alkali metal soap and an oversized particle formation-suppressing amount of an alkaline earth metal soap and cooling the resulting dispersion to obtain said resin as finely divided particles of which no more than about 5 weight percent of the total exceeds an average diameter of about 420 microns.

DESCRIPTION OF THE PREFERRED EMBODIMENTS

In general, the polymers suitable for the practice of this invention include any normally solid synthetic organic polymeric thermoplatic resin whose decomposition point is somewhat higher than its melting point and somewhat less than the critical temperature of water. Included are polyolefins, vinyls, olefin-vinyl copolymers, olefin-allyl copolymers, polyamides, acrylics, polystyrenes, cellulosics, polyesters, and fluorocarbons.

The polyolefins most suitable for the practice of this invention include normally solid polymers of olefins, particularly mono-alpha-olefins, which comprise from two to about six carbon atoms, e.g., polyethylene which is preferred, polypropylene, polybutene, polyisobutylene, poly(4-methylpentene), and the like. Preferred polyolefin feeds are polyethylene and polypropylene.

Vinyl polymers suitable for use in this invention include polyvinyl chloride, polyvinyl fluoride, vinyl chloride/vinyl acetate copolymers, polyvinylidene chloride and fluoride.

Suitable olefin-vinyl copolymers include those of ethylene-vinyl acetate, ethylene-vinyl propionate, ethylene-vinyl isobutyrate, ethylene-vinyl alcohol, ethylene-methyl acrylate, ethylene-ethyl acrylate, ethylene-ethyl methacrylate, ethylene-acrylic acid, ethylene-methacrylic acid and their salts and the like. Especially preferred are tacky ethylene-vinyl acetate copolymers and ethylene-vinyl acetate-vinyl alcohol terpolymers wherein the vinyl acetate constitutes at least about 25% of the resin by weight.

Olefin-allyl copolymers include ethylene-allyl alcohol, ethylene-allyl acetate, ethylene-allyl acetone, ethylene-allyl benzene, ethylene-allyl ether, ethylene-acrolein, and the like. Ethylene-allyl alcohol is especially preferred.

Preferred among the polyamides are linear superpolyamide resins commonly referred to as nylons. Such polymers can be made by the intermolecular condensation of linear diamines containing from 6 to 10 carbon atoms with linear dicarboxylic acids containing from 2 to 10 carbon atoms. Equally well, the superpolyamides may be made from amine-forming derivatives of these monomers such as esters, acid chlorides, amine salts, etc. Also suitable are superpolyamides made by the intramolecular polymerization of omega-amino-acids containing 4 to 12 carbon atoms and of their amide-forming derivatives, particularly the internal lactams. Examples of specific nylons are polyhexamethylene adipamide, polyhexamethylene sebacamide, and polycaprolactam. Especially preferred are nylons having intrinsic viscosities ranging between 0.3 and 3.5 dl/g. determined in m-cresol.

Acrylic resins suitable for use in this invention include polymethyl methacrylate, polyacrylonitrile, polymethyl acrylate, polyethyl methacrylate, etc. Preferred is polymethyl methacrylate.

Although the EVA and HEVA copolymers which are preferred for use in the practice of this invention can be prepared by any suitable polymerization process, for example by way of solution and dispersion or emulsion polymerization techniques, they are advantageously prepared by the much faster high pressure bulk polymerization process in current use.

The preferred EVA copolymers herein contain from about 15 to about 75 percent by weight of combined ethylene, the balance of the polymer being made up of combined vinyl acetate. The copolymers can also contain up to about 20% by weight of a combined third comonomer polymerizable with ethylene and vinyl acetate. Illustrative termonomers are methyl acrylate, methyl methacrylate, ethyl acrylate, ethyl methacrylate, propyl acrylate, propyl methacrylate, butyl acrylate, butyl methacrylate, dimethyl itaconate, diethyl itaconate, dimethyl-2-methylene glutarate, diethyl-2-methylene glutarate, dimethyl maleate, diethyl fumarate, dibutyl fumarate, and the like. When a third conomoner is present in the polymer, the vinyl acetate content of the balance of the polymer will vary from 25 to 85% of the said balance, the raminder being ethylene.

The melt flow rates of the EVA copolymers can range from less than about 0.1 to up to about 100 or even higher. (Conditions B, ASTM D1238-73). The preferred copolymers are those with a MFR of less than about 40, more preferred are those of less than about 25, and most preferred are the copolymers of less than about 10 MFR.

According to the present process, EVA copolymer or other thermoplastic resin is agitated in the molten state in an aqueous dispersion system comprising a resin-dispersing amount of an alkali metal soap of a higher carboxylic acid, an oversize particle formation suppressing amount of an alkaline earth metal soap of a higher carboxylic acid, optionally with a water-soluble, substantially neutral salt inert to the aforesaid soaps, and the dispersion system with the copolymer in the disperse state is cooled to below about 100° C.

In accordance with preferred practice and as explained in greater detail below, following the formation of the dispersed resin, all or part of the alkali metal soap component of the dispersion medium can be converted to an alkaline earth metal soap by reaction with a source of alkaline earth metal, e.g., calcium hydroxide or oxide. The thus formed alkaline earth metal soap forms a thin coating, or parting agent, about the resin particles thereby preventing their blocking or agglomerating into unmanageable clumps of material. Less desirably, the dispersion medium can be acidified to convert part or all of the alkali metal soap and alkaline earth metal soap to the carboxylic acid(s) from which they were derived, such acid(s) also functioning as parting agent(s) although to a lesser extent than alkaline earth metal soap. The thus treated tacky resin particles can be readily separated from the dispersion medium, e.g., by filtration or concentration.

The freshly recovered resin particles are thereafter preferably washed with cold water, advantageously deionized or distilled, to remove contained water-soluble compounds and the washings are combined with the mother liquor. These washings contain little, if any, soap or higher carboxylic acid. The acid employed for acidification is desirably selected to match the anion of the aforesaid water-soluble, substantially neutral salt if present, e.g., hydrochloric acid for sodium chloride. When the source of alkaline earth metal ions, e.g., calcium hydroxide is added to convert the alkali metal soap to an alkaline earth metal soap, e.g., calcium soap, for a parting agent, the mother liquor will contain alkali metal hydroxide which can be recycled, for example to make additional in situ soap or simply neutralized to provide addition water-soluble salt. Normally a substantial proportion of the water is then removed by distillation and the residue, containing substantially all of the water-soluble salt and alkali (if any) can be recycled as dispersion medium.

In each of the aforedescribed processes, the alkali metal soap component of the dispersant system can be a preformed soap, or, alternatively, the soap can be formed in situ, e.g., by saponifying a fatty acid glyceride or other fatty acid ester and/or by esterifying a fatty acid. Each component of the dispersion system, i.e., resin, water, alkali metal soap (or precursors thereof), alkaline earth metal soap and optional water-soluble, substantially neutral salt, can be introduced independently and separately into the dispersion vessel or in combinations of two or more such components. It is further within the scope of this invention to blend either or both soaps and/or salt in the resin which is to be dispersed although ordinarily, little advantage may be derived from this.

The preferred alkali metal soaps are soaps of alkali metals of atomic weight of at least 23, i.e., sodium, potassium, rudidium and cesium, and, of these, the more preferred are sodium and potassium because of their availability or ease of preparation, the most preferred being sodium which is most economical and practical.

The alkali metal soaps for use in the foregoing dispersion processes are known compounds, i.e., salts of higher carboxylic acids with the alkali metals.

The higher carboxylic acid moiety of the alkali metal soap is normally a monobasic acid, although certain dibasic acids are effective. The acid moiety may be linear or branched. It may be saturated or unsaturated, usually ethylenically unsaturated. Most commonly, however, the higher carboxylic acid moiety is a fatty acid moiety, and it can be composed of a mixture of such acids, for example as is obtained by saponification of natural glyceride fats. The term "higher carboxylic acid" as used in this invention includes the so-called dimer acids made by dimerization of polyunsaturated linear fatty acids. Also included in the term "higher carboxylic acid" are rosin or abietic acids. The soap should not react adversely to any appreciable extent with the polymer substrates, i.e., it should be substantially inert to the polymer. As employed herein, and in the appended claims, the term "soap" embraces the aforesaid salts of higher carboxylic acids.

The preferred higher carboxylic acid is a straight-chain $C_8$-$C_{22}$ monocarboxylic acid, which can be saturated or can contain one or more carbon-carbon double bonds per molecule, and can contain an even or odd number of carbon atoms. Examples are caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachidic (arachic) acid, heneicosanoic acid, behenic acid, 10-undecylenic acid, elaidic acid, oleic acid, erucic acid, brassidic acid, bicarbonate, acetate or propionate anion, or similar such anions. Mixtures of salts can be employed.

Specific examples of the water-soluble salts are lithium fluoride, lithium chloride, sodium chloride, sodium bisulfate, sodium sulfate, sodium hydrogen phosphate, ammonium chloride, potassium dihydrogen phosphate, sodium acetate, sodium propionate, etc. The cation of the soap and the water soluble salt may be the same or different.

It is usually preferred that the ratio of thermoplastic resin to water range from about 0.1 to about 3 parts of resin per part of water on a weight basis. Lower ratios are operable, but uneconomical, whereas higher ratios, though usable, present operational difficulties. The most preferred range is about 0.2 to about 0.5 parts of resin per part of water on a weight basis. For in situ alkali metal soap formation, equivalent amounts of base are added to the fatty acid, the preferred ratio being from about 1.05 to about 1.1. Higher ratios are of no advantage unless saponification of the polymer is also desired. The weight ratio of alkali metal soap to resin may vary from about 0.01 to about 0.30, the preferred ratio being from about 0.03 to about 0.12. The use of lower ratios of alkali metal soap does not always result in the desired dispersion of the resin; high ratios are generally unnecessary and therefore uneconomical. The preferred alkali metal soap is a fatty acid soap, the most preferred fatty acid soap being sodium stearate.

The weight ratio of alkaline earth metal soap is preferably in the range of from about 0.1 to about 2.0 parts per hundred part of resin, preferably from about 0.1 to about 1.0 parts per hundred parts of resin.

Although the thermoplastic resins of this invention can be dispersed in the absence of a water-soluble, substantially neutral salt, the latter is often included to regulate particle size. The added salt will produce smaller primary particles at appropriate concentration ranges. Nevertheless, the particles actually recovered when water-soluble, substantially neutral salts are present during dispersion tend to be agglomerates of the primary particles, so that the net effect of added salt is often to produce an agglomerate that is coarser than the primary particles formed in the absence of the salt. The concentration of water-soluble, substantially neutral salt in the water may range from at least about 0.1 and up to about 15 weight percent of resin. Sodium chloride, sodium sulfate, and sodium acetate are the preferred water-soluble salts. Halide salts, particularly chlorides, though operable, are not preferred with stainless steel equipment, because of the tendency to cause stress-corrosion cracking of the steel. A nickel alloy (Monel) is preferred for halide service.

The dispersion temperature may range from about 100° to about 270° C., but temperatures of from about 130° to about 250° C. are preferred. Dispersions are usually not readily obtainable at lower temperatures and higher temperatures are usually not required for successful dispersion. The pressure is autogenous. The rate of stirring should vary from about 2600 to about 4000 rpm with from about 3200 to about 3800 rpm being preferred, although stirring rates that are lower are at times sufficient. Higher stirring rates may be employed but usually are not advantageous. The dispersion times range from about 1 minute to about 1 hour; times of about 5 to about 15 minutes are preferred.

The dispersions of thermoplastic resin substrate preferred for use in the present invention are generally composed of particles, usually spherical, of an average diameter ranging from about 20 microns up to about 500 microns with no more than about 5 weight percent of the particles, and preferably no more than 2 weight percent of the particles, exceeding an average diameter of about 420 microns. The majority (80–90%) of the particles are usually less than 250 microns. With the preferred dispersing systems, a substantial majority of the particles are less than about 150 microns, usually ranging from about 20 to about 150 microns with most of the particles being in the range of about 50 to about 100 microns. As should be expected, the efficiency of these dispersion processes and the particle size of the dispersed products will vary to a certain extent with the selected soaps and salt, the temperature, the amounts of reagents employed and other factors with which those skilled in the art are familiar.

The preferred HEVA resins which are useful in the practice of this invention can be prepared by any one of several known and conventional hydrolysis processes, for example, by alcoholysis of EVA in a solution of a hydrocarbon and an alcohol (U.S. Pat. No. 3,985,719). Partially hydrolyzed EVA resins are normally elastomeric and more or less tacky at room temperature.

For reasons of efficiency and convenience, however, it is preferred to conduct the hydrolysis by saponification during the comminution-dispersion process itself, by adding a sufficient amount of a strong inorganic base to saponify the desired amount of combined vinyl acetate. The same strong bases recited above in connection with the preparation of alkali metal soaps can be used as saponification agents, with sodium hydroxide and potassium hydroxide being preferred.

The choice of coating techniques will to some extent be determined by the procedure used for preparing the particulate EVA and HEVA resin particles. When an EVA copolymer dispersion is prepared according to the preferred processes described above, the dispersion will contain an alkali metal salt of a higher carboxylic acid.

In the preferred embodiment of this invention, an alkaline earth metal compound such as magnesium hydroxide, calcium hydroxide, strontium hydroxide, barium hydroxide, or a corresponding oxide, bicarbonate, carbonate, halide, and the like, is added to the cooled dispersion of thermoplastic resin to convert the alkali metal soap, employed as dispersing agent, into an insoluble alkaline earth metal soap. The insoluble alkaline earth metal soap will then coat the resin particles, the amount deposited being regulated by the amount of alkali metal soap employed to disperse the copolymer, with an alkaline earth metal compound being added in stoichiometric amount or in slight excess. Calcium hydroxide is the preferred alkaline earth metal compound and may be added as an aqueous solution, as an aqueous dispersion, or in the solid form, conveniently as a powder. The metathetical reaction is very rapid and complete. When the alkaline earth metal salt is a hydroxide, an oxide or a carbonate, an alkali hydroxide or carbonate is produced as a by-product that can be recovered and reacted with more higher carboxylic acid to produce additional alkali metal soap for subsequent dispersions. The individual resin particles will be coated over substantially the entire outermost surfaces thereof with insoluble alkaline earth soap thereby providing the copolymer particles with greatly improved parting characteristics. Acceptable results can be obtained by coating the resin particles with from about 1% to about 30% by weight of alkaline earth metal soap, and preferably from about 3% to about 18% of this parting agent. Such particles, which are easy to recover by filtration, will withstand drying at elevated temperatures, and will have sufficient compaction resistance when bags of powder are stacked under hot storage conditions.

The amount of alkaline earth metal soap required will be dictated by the amount necessary to impart the desired compaction resistance to the final dry powder. The amount of alkali metal soap used in the dispersion process can be adjusted to provide for the desired amount of alkaline earth metal soap parting agent. If desired, supplemental preformed alkaline earth metal soap of a higher carboxylic acid may be added to provide additional compaction resistance.

Parting agent fines do not present a problem, as they do when an alkaline earth metal soap is subsequently added as a parting agent to copolymer particles dispersed with Pluronic dispersants. Perhaps a portion of alkali metal soap used as a dispersant is anchored firmly to the particle surfaces, perhaps by solubility of the long hydrocarbon part of the soap molecules in the particle, leaving the ionic end of the molecule at the water-particle interface. When reaction with calcium hydroxide occurs, the calcium ion by virute of its divalent nature, can serve as a bridging moiety between an aforesaid higher carboxylic acid soap anion anchored in the outermost particle layer and another higher carboxylic acid soap anion dissolved or dispersed in the aqueous medium. Additionally, it is possible that the ionic character of the alkaline earth soap parting agent thus anchored to the particle surface can, by coulombic forces, serve to attract and bind additional molecules of alkaline earth soap molecules to the particle. However, applicant does not wish to be bound by this theoretical explanation.

It is obvious, of course, that there is no need to separate and recycle any of the alkali metal soap used as dispersing agent, nor is it advantageous to do so. Substantially all of it is converted to alkaline earth metal soap parting agent.

When the powder is employed as a dry-blendable impact modifier, for example, EVA blended in rigid PVC, the alkaline earth metal soap finally serves as an external lubricant in the formulation. The great versatility of this embodiment of the invention is apparent from the fact that the same given amount of higher carboxylic acid serves three main functions: (a) as the alkali metal soap it comminutes tacky EVA copolymers from the pellet or block form into the fine particle form by dispersion in water; (b) on conversion to the alkaline earth soap, it provides parting action to permit isolation and handling of the dispersed particles as a compaction-resistant dry powder; and (3) also in the alkaline earth soap form it can perform various functions in subsequent formulations, e.g., as a lubricant in rigid PVC formulation.

The preferred thermoplastic resin dispersion system for use in this coating operation contains sodium or potassium stearate (and optionally the corresponding chloride) and the preferred alkaline earth metal compound is calcium hydroxide.

Thus, the preferred parting agent according to this invention is calcium stearate.

In a further embodiment of the invention, an acid, for example, acetic acid, hydrochloric acid or sulfuric acid is added to the cooled dispersion of thermoplastic resin to convert the alkali metal and/or alkaline earth metal soap therein to the water-insoluble higher carboxylic acid from which they were derived. The higher carboxylic acid will in this manner coat the copolymer particles. The protective action of the higher carboxylic acid is normally sufficient to permit recovery of the resin powder without any danger of coalescing the particles. Filtration is rapid, and the powder can be dried under mild conditions but will not, in general, have sufficient compaction resistance for storage at elevated temperatures. It is advantageous to add a supplemental amount of preformed or in situ alkaline earth metal soap to achieve greater compaction resistance. The addition may be made directly to the acidified dispersion, or it may be blended into the wet filter cake, or added to the dry, higher carboxylic acid-coated particles. The parting agent may advantageously be added as a paste with, for example, a small amount of an alcohol, such as methanol, ethanol, propanol, etc.

EXAMPLE

By way of demonstrating the effect of the presence of alkaline earth metal soap in suppressing the formation of an oversize fraction, the following dispersion runs were carried out with varying amounts of calcium stearate.

The following were charged to an autoclave: 150 gm Vynathene EY-901 (an ethylene-vinyl acetate resin containing from about 38 to 43 percent copolymerized vinyl acetate units from U.S. Industrial Chemicals Co., division of National Distillers and Chemical Corporation) milled with 7.8 parts per hundred (pph) stearic acid, 3.8 pph calcium stearate, a sufficient quantity of sodium hydroxide to neutralized the stearic acid to sodium stearate in situ and 460 ml. water. The autoclave was heated to 200° C. accompanied by rapid stirring. After 10 minutes, the contents of the autoclave were cooled to ambient temperature, the resin particles were recovered by filtration and following water washing, the particles were dried, weighed and sieved.

Substantially the same procedure was followed but employing 0.47, 0.95, 1.90, 7.60 and 0 pph (as a control) of calcium stearate. The particle size distribution of the dispersed resin in each run is given in the table below. As shown in the table, the presence of minor a mounts of calcium stearate, in the case of the particular EVA resin and dispersion conditions selected, less than 0.95 pph calcium stearate and in some cases, less than 1.90 pph calcium stearate, significantly reduced the formation of oversized particles compared to the control run in which no calcium stearate was present.

TABLE

PARTICLE SIZE DISTRIBUTION OF EVA POWDER DISPERSED WITH VARYING AMOUNTS OF CALCIUM STEARATE

| Ca Stearate pph | Weight % of Particles having a Diameter in Microns of | | | | | |
|---|---|---|---|---|---|---|
| | <53 | 53-106 | 106-149 | 149-250 | 250-420 | >420 |
| — | 17.3 | 41.2 | 17.0 | 14.2 | 5.6 | 4.6 |
| .47 | 12.4 | 44.5 | 25.7 | 14.1 | 2.8 | .5 |
| .95 | 8.1 | 55.9 | 26.8 | 8.3 | .6 | .2 |
| 1.9 | 4.1 | 19.8 | 45.4 | 22.0 | 7.7 | 1.0 |
| 3.8 | 4.5 | 23.4 | 23.5 | 27.5 | 17.8 | 3.3 |
| 7.6 | 1.7 | 5.5 | 7.3 | 21.4 | 33.5 | 30.5 |

Recipe: 150 parts EY 901
460 parts H$_2$O
12.5 parts sodium stearate (made in situ)
Calcium stearate, pph based on polymer
Temperature: 200° C.

What is claimed is:

1. A process for obtaining particles of thermoplastic resin which comprises agitating said resin in the molten state in an aqueous dispersion system comprising a resin-dispersing amount of an alkali metal soap wherein the weight ratio of said alkali metal soap to resin is within the range of from about 0.01 to about 0.30, and an oversize particle formation-suppressing amount of an alkaline earth metal soap wherein the weight ratio of said alkaline earth metal soap is within the range of from about 0.1 to about 2.0 parts per hundred parts of resin, and cooling the resulting dispersion to obtain said resin as finely divided particles of which no more than about 5 weight percent of the total exceeds an average diameter of about 420 microns.

2. A process according to claim 1 wherein said thermoplastic resin is a tacky ethylene-vinyl acetate copolymer or tacky partially hydrolyzed ethylene-vinyl acetate terpolymer.

3. A process according to claim 1 wherein said thermoplastic resin is a polyethylene homopolymer.

4. A process according to claim 1 wherein said alkali metal soap is that of a saturated fatty acid of from about 8 to about 22 carbon atoms.

5. A process according to claim 1 wherein said dispersion system further comprises a water-soluble substantially neutral salt inert to said soap.

6. A process according to claim 1 wherein said alkali metal soap is an alkali metal stearate.

7. A process according to claim 6 wherein said alkali metal soap is sodium stearate.

8. A process according to claim 1 wherein said alkaline earth metal soap is that of a saturated fatty acid of from 8 to about 22 carbon atoms.

9. A process according to claim 1 wherein said alkaline earth metal soap is an alkaline earth metal stearate.

10. A process according to claim 9 wherein said alkaline earth metal soap is calcium stearate.

11. A process according to claim 1 including the further step of adding to the resulting dispersion, a supplemental parting agent for said resin particles.

12. A process according to claim 2 wherein the partially hydrolyzed ethylene-vinyl acetate resin is obtained in situ by the alkali metal hydroxide-catalyzed hydrolysis of ethylene-vinyl acetate resin.

13. A process according to claim 1 wherein the alkali metal soap is obtained in situ by the saponification of fatty acid glyceride.

14. A process according to claim 12 wherein said hydrolysis is carried out in the presence of a sufficient amount of alkali metal hydroxide to saponify fatty acid glyceride to provide alkali metal soap in situ.

15. A process according to claim 1 wherein subsequent to formation of the dispersion, said alkali metal soap is converted to alkaline earth metal soap.

16. A process according to claim 15 wherein sodium soap is converted to calcium soap.

17. A process according to claim 16 wherein sodium stearate is converted to calcium stearate.

18. A process according to claim 1 wherein subsequent to formation of the dispersion, alkali metal soap is converted to the free fatty acid from which said alkali metal soap was derived.

19. A process according to claim 1 wherein said particles of thermoplastic resin are substantially spheroidal in configuration.

20. A process according to claim 1 wherein the alkali metal soap is obtained in situ by the neutralization of fatty acid with alkali metal hydroxide.

21. A process according to claim 12 wherein said hydrolysis is carried out in the presence of a sufficient amount of alkali metal hydroxide to neutralize fatty acid to provide alkali metal soap in situ.

22. A process according to claim 1 wherein subsequent to formation of the dispersion, alkaline earth metal soap is converted to the free fatty acid from which said alkaline earth metal soap was derived.

23. A process according to claim 1 wherein the weight ratio of alkali metal soap to resin is within the range of from about 0.03 to about 0.12.

24. A process according to claim 1 wherein the weight ratio of alkaline earth metal soap is with in the range of from about 0.1 to about 1.0 parts per hundred parts of resin.

* * * * *